United States Patent
Moretti et al.

(10) Patent No.: US 12,341,421 B2
(45) Date of Patent: Jun. 24, 2025

(54) POWER CONVERTER CONTROL MODULE

(71) Applicant: STMicroelectronics S.r.l., Agrate Brianza (IT)

(72) Inventors: Emanuele Moretti, Milan (IT); Ivan Floriani, Milan (IT); Giulia Altamura, Cusago (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 265 days.

(21) Appl. No.: 18/171,946

(22) Filed: Feb. 21, 2023

(65) Prior Publication Data
US 2023/0283168 A1 Sep. 7, 2023

(30) Foreign Application Priority Data

Mar. 7, 2022 (IT) .................. 102022000004283

(51) Int. Cl.
*H02M 1/32* (2007.01)
*H02M 1/00* (2006.01)
*H02M 3/158* (2006.01)

(52) U.S. Cl.
CPC ........... *H02M 1/32* (2013.01); *H02M 1/0009* (2021.05); *H02M 3/1582* (2013.01)

(58) Field of Classification Search
CPC ..... H02M 1/32; H02M 1/0009; H02M 3/1582
See application file for complete search history.

(56) References Cited

U.S. PATENT DOCUMENTS

| | | | | |
|---|---|---|---|---|
| 10,243,463 | B2* | 3/2019 | Sun | H02M 3/1582 |
| 10,978,947 | B2* | 4/2021 | Amin | H02M 3/158 |
| 11,616,443 | B2* | 3/2023 | Lien | H02M 1/08 |
| | | | | 323/271 |
| 2017/0207703 | A1* | 7/2017 | Houston | H02M 3/1582 |
| 2017/0257031 | A1* | 9/2017 | Shao | H02M 3/1582 |

OTHER PUBLICATIONS

Yuan, Bing et al., "Hybrid Buck Converter With Constant Mode Changing Point and Smooth Mode Transition for High-Frequency Applications", IEEE Transactions on Industrial Electronics, NJ, USA, vol. 67, No. 2, Feb. 2020, pp. 1466-1474.

* cited by examiner

Primary Examiner — Rafael O De Leon Domenech
(74) Attorney, Agent, or Firm — Slater Matsil, LLP

(57) ABSTRACT

A control module is used to control a switching buck-boost converter that includes an inductor, a capacitor, a first top switch and a second top switch, a first bottom switch and a second bottom switch and a diode coupled to the second top switch. The control module controls the switching buck-boost converter so as to alternate: first time periods, in which the second top switch is open and cycles of charge and discharge of the inductor are carried out, during which the inductor is traversed by a current that also passes through the diode and charges the capacitor; and second time periods, in which the first and second top switches are open and the first and second bottom switches are closed so that the current in the inductor recirculates, and the capacitor is discharged by a current that flows in the load.

20 Claims, 10 Drawing Sheets

POWER CONVERTER CONTROL MODULE

CROSS-REFERENCE TO RELATED APPLICATIONS

This application claims the benefit of Italian Patent Application No. 102022000004283, filed on Mar. 7, 2022, which application is hereby incorporated herein by reference.

TECHNICAL FIELD

The present invention relates generally to electronic circuits and more particularly to a power converter control module.

BACKGROUND

As is known, there are today available so-called DC-DC converters, also known as switching converters, which enable generation, starting from a dc input voltage, of an output voltage, which is of a dc type and may be higher or lower than the input voltage. Furthermore, the output voltage may be applied to a load.

In order to detect a malfunction, it is known to use systems for detecting overcurrents in order to activate load-protection mechanisms. In particular, it is known to measure a voltage across a shunt resistor having a low resistance (just a few milliohms) to detect overcurrent conditions. However, in numerous applications, the switching converter may be kept in a low-power operating mode known as low-power mode, where the converter provides a low regulated current. In such conditions, low power modes, detecting an overcurrent condition entails detecting a very low voltage across the shunt resistor, which may be difficult to accurately measure.

SUMMARY

In accordance with an embodiment, a control module is used to control a switching buck-boost converter comprising an input node configured to receive an input voltage, an output node configured to couple to a load, an inductor, a capacitor, a first top switch, a second top switch, a first bottom switch, and a second bottom switch, the first top switch and the first bottom switch being connected in series so as to form a first internal node, the second top switch and second bottom switch being connected in series so as to form a second internal node, the inductor being coupled to the first and second internal nodes, the first and second top switches being coupled, respectively, to the input node and to the output node, the capacitor being coupled to the output node, the switching buck-boost converter further comprising a diode coupled to conduction terminals of the second top switch and configured to prevent discharging of the capacitor through the second internal node, when the second top switch is open. The control module includes a controller, an acquisition circuit, and an overcurrent detection circuit. The controller is configured to operate, when coupled to the switching buck-boost converter, in a low-power operating mode during which the controller causes the switching buck-boost converter to alternate between first time periods and second time periods. During the first time periods, the controller is configured to cause the second top switch to be open, and is configured to control the first top switch, the first bottom switch, and the second bottom switch to execute cycles of charge and discharge of the inductor, during which the inductor is traversed by a current, wherein the current traverses the diode during each discharge cycle of the inductor and charges the capacitor in a manner that causes a voltage on the output node to increase from a low threshold value to a high threshold value. During the second time periods, the controller is configured to cause the first top switch and the second top switch to be open, to cause the first bottom switch and the second bottom switch to be closed during which the current in the inductor recirculates through the first and second bottom switches and the capacitor is discharged by a current that flows in the load in a manner that causes the voltage on the output node to decrease from the high threshold value to the low threshold value. The acquisition circuit is configured to generate a digital signal indicative of durations of the second time periods; and the overcurrent-detection circuit is configured to receive the digital signal and comprising a first comparison circuit configured to compare the duration of each second time period with a first limit duration and to indicate an occurrence of an overcurrent when the duration of the second time period is shorter than the first limit duration.

In accordance with another embodiment, a method is used to control a switching buck-boost converter comprising an input node configured to receive an input voltage, an output node configured to couple to a load, an inductor, a capacitor, a first top switch, a second top switch, a first bottom switch, and a second bottom switch, the first top switch and the first bottom switch being connected in series so as to form a first internal node, the second top switch and second bottom switch being connected in series so as to form a second internal node, the inductor being coupled to the first and second internal nodes, the first and second top switches being coupled, respectively, to the input node and to the output node, the capacitor being coupled to the output node, the switching buck-boost converter further comprising a diode coupled to conduction terminals of the second top switch and configured to prevent discharging of the capacitor through the second internal node, when the second top switch is open. The method includes operating the switching buck-boost converter in a low-power operating mode comprising alternating first time periods and second time periods. During the first time periods, operating the switching buck-boost converter in the low-power operating mode comprises causing the second top switch to be open, controlling the first top switch, the first bottom switch, and the second bottom switch to execute cycles of charge and discharge of the inductor during which the inductor is traversed by a current, wherein the current traverses the diode during each discharge cycle of the inductor and charges the capacitor in a manner that causes a voltage on the output node to increase from a low threshold value to a high threshold value, and during the second time periods. Operating the switching buck-boost converter in the low-power operating mode comprises causing the first top switch and the second top switch to be open, causing the first bottom switch and the second bottom switch to be closed during which the current in the inductor recirculates through the first and second bottom switches and the capacitor is discharged by a current that flows in the load in a manner that causes the voltage on the output node to decrease from the high threshold value to the low threshold value. The method also includes generating a digital signal indicative of the durations of the second time periods; and based on the digital signal, comparing the duration of each second time period with a first limit duration and indicating an occurrence of an overcurrent when the duration of the second time period is shorter than the first limit duration.

In accordance with a further embodiment, a switched-mode power supply includes a power supply controller configured to be coupled to a power supply circuit comprising a plurality of switches coupled between a power input node and a power output node, and an inductor coupled to the plurality of switches, the power supply controller configured to operate the power supply circuit in a low-power mode comprising alternating first time periods and second time periods. The power supply controller is configured to: apply an active switching signal to at least one of the plurality of switches during the first time periods when an output voltage of the power output node transitions from a first predetermined voltage threshold to a second predetermined voltage threshold, and apply a static switching signals to each of the plurality of switches during the second time periods when the output voltage of the power output node transitions from the second predetermined voltage threshold to the first predetermined voltage threshold. The switched-mode power supply also includes a voltage measurement circuit configured to be coupled to the power output node; and a first overcurrent measurement circuit coupled to the voltage measurement circuit and configured to indicate a first overcurrent condition when a time duration of a first time period is less than a first threshold, or when a time duration of the second period is greater than a second threshold.

BRIEF DESCRIPTION OF THE DRAWINGS

For a better understanding of the present invention preferred embodiments thereof are now described, purely by way of non-limiting example, with reference to the attached drawings, wherein.

DETAILED DESCRIPTION OF ILLUSTRATIVE EMBODIMENTS

Various embodiments relate to a module for controlling a switching buck-boost converter with overcurrent detection and to a corresponding method for controlling a buck-boost converter.

Figure 1:
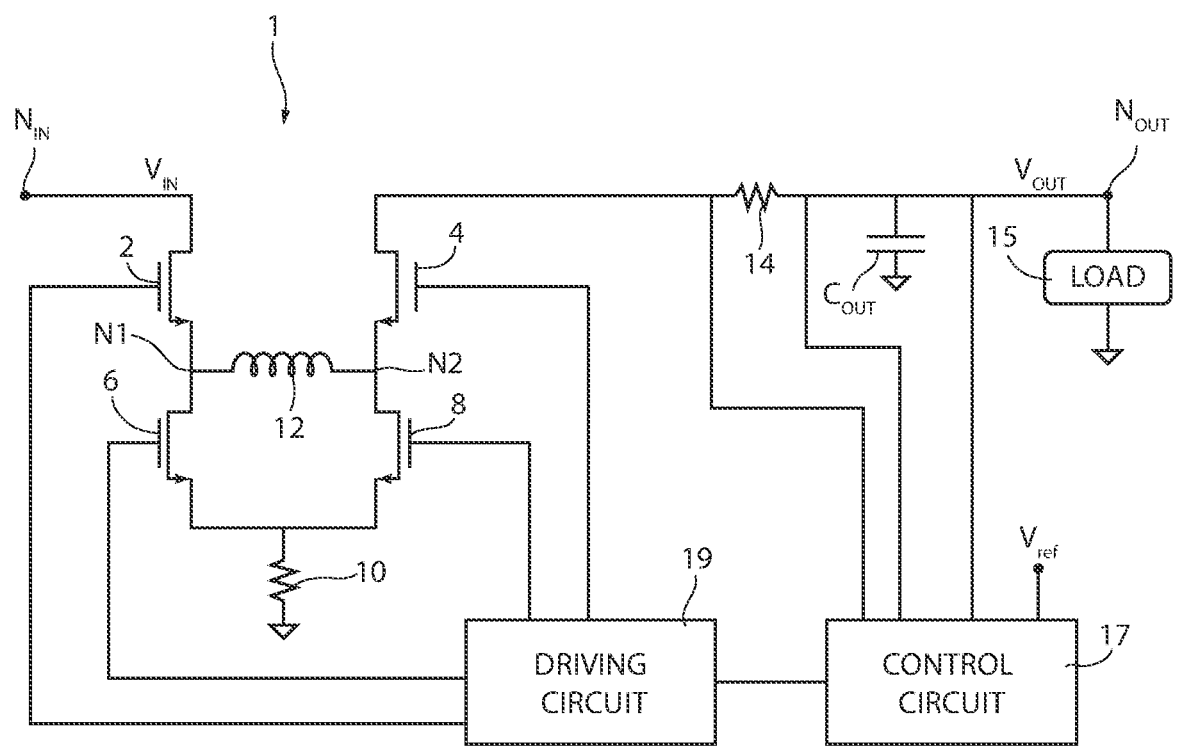
FIG. 1 shows a circuit diagram of a converter.

FIG. 1 shows a converter 1 that comprises four NMOS transistors, which are, for example power MOSFETs formed in corresponding integrated circuits and referred to in what follows as the first and second top transistors 2, 4 and the first and second bottom transistors 6, 8, respectively.

The source terminals of the first and second top transistors 2, 4 are respectively connected to the drain terminals of the first and second bottom transistors 6, 8 to form a first internal node N1 and a second internal node N2, respectively. The source terminals of the first and second bottom transistors 6, 8 are connected to a first terminal of a resistor 10, the second terminal of which is connected to ground. There is further present an inductor 12, the terminals of which are connected to the first and second internal nodes N1, N2, respectively.

The drain terminal of the first top transistor 2 forms an input node $N_{IN}$ and is designed to receive an input voltage $V_{IN}$ of a dc type. The drain terminal of the second top transistor 4 is connected to a first terminal of a shunt resistor 14, the second terminal of which forms an output node $N_{OUT}$, to which the load 15 is connected. In practice, the load 15 is connected between the output node $N_{OUT}$ and ground. Furthermore, a capacitor $C_{OUT}$ is connected in parallel to the load 15, between the output node $N_{OUT}$ and ground.

The first and second terminals of the shunt resistor 14 and the output node $N_{OUT}$ are connected to a control circuit 17. The gate terminals of the first and second top transistors 2, 4 and of the first and second bottom transistors 6, 8 are connected to a driving circuit 19, which is further connected to the control circuit 17. The control circuit 17 and the driving circuit 19 form a control module 20 of the converter 1.

Figure 2A:
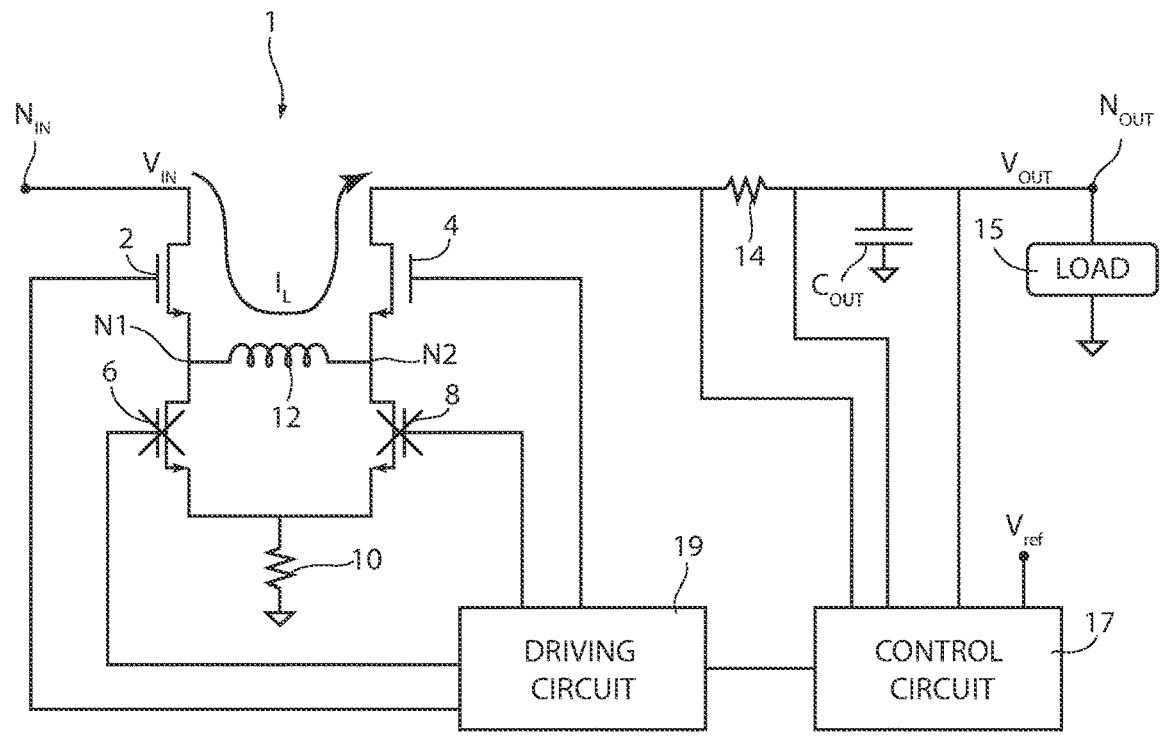
FIGS. 2A and 2B show circuit diagrams of the converter illustrated in FIG. 1 when the converter operates in a first normal operating mode.
Figure 2B:
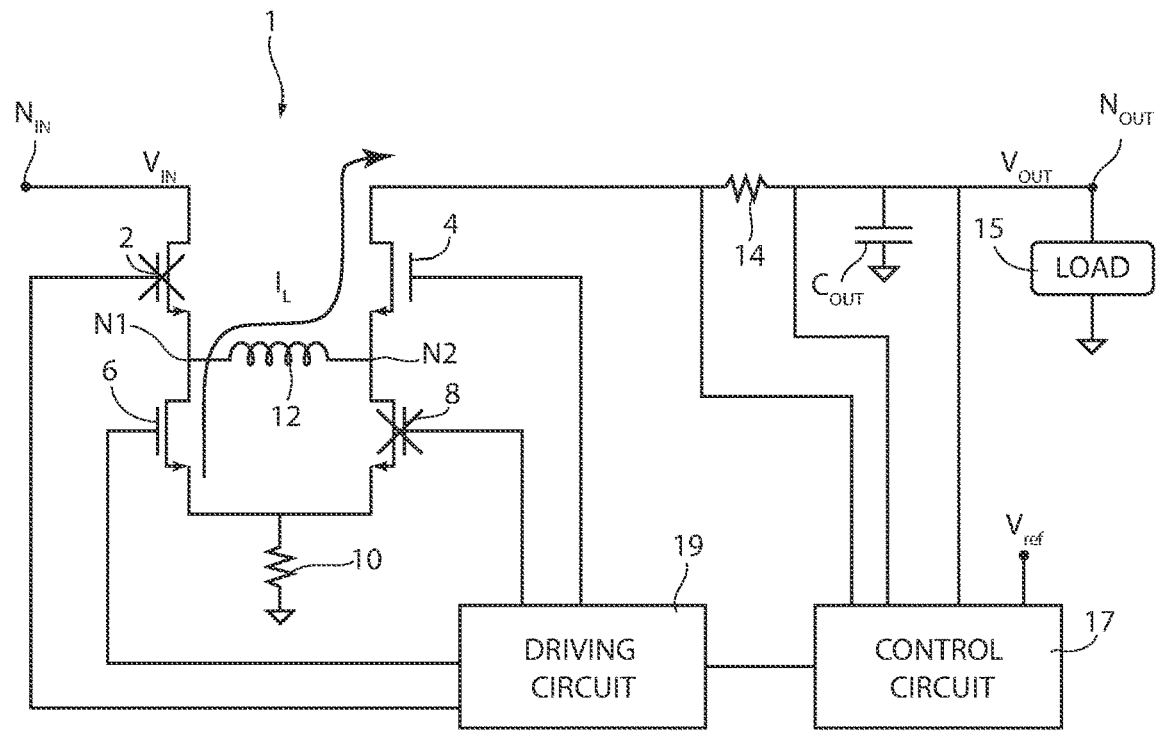

The control module 20 may control the first and second top transistors 2, 4 and the first and second bottom transistors 6, 8 so that the converter 1 operates in a first operating mode, illustrated schematically in FIGS. 2A and 2B.

In detail, in the first operating mode, the second top transistor 4 is always on to couple the second internal node N2 to the first terminal of the shunt resistor 14. The second bottom transistor 8 is instead off so as to decouple the second internal node N2 from the resistor 10, and thus from ground.

The first top transistor 2 and the first bottom transistor 6 are, instead, controlled by the control module 20 in an alternating way. In particular, for each time period T, also known as switching period T, the first top transistor 2 is kept on for a time interval $T_{ON}$, while the first bottom transistor 6 is off, as illustrated in FIG. 2A. In this way, a current $I_L$ that increases linearly in time flows in the inductor 12; in other words, the inductor 12 is progressively charged. The current $I_L$ further flows in the shunt resistor 14 and, in part, charges the output capacitor $C_{OUT}$ and, in part, the load 15. During the time interval $T_{ON}$, energy is consequently stored in the inductor 12 and in the output capacitor $C_{OUT}$.

Once the time interval $T_{ON}$ is over, the first top transistor 2 is switched off, while the first bottom transistor 6 is switched on, the configuration remaining for a time interval $T_{OFF}$, until the end of the time period T and being represented in FIG. 2B. Ideally, we have $T=T_{ON}+T_{OFF}$. In this configuration, the inductor 12 and the output capacitor $C_{OUT}$ gradually discharges; in particular the current $I_L$ gradually decreases, possibly until it vanishes.

In practice, in the first operating mode, the converter 1 behaves like a so-called buck converter. For this reason, in what follows, the first operating mode will be referred to as buck mode. The inductor 12 thus undergoes charge and discharge cycles, with transfer of energy onto the load 15.

Figure 3A:
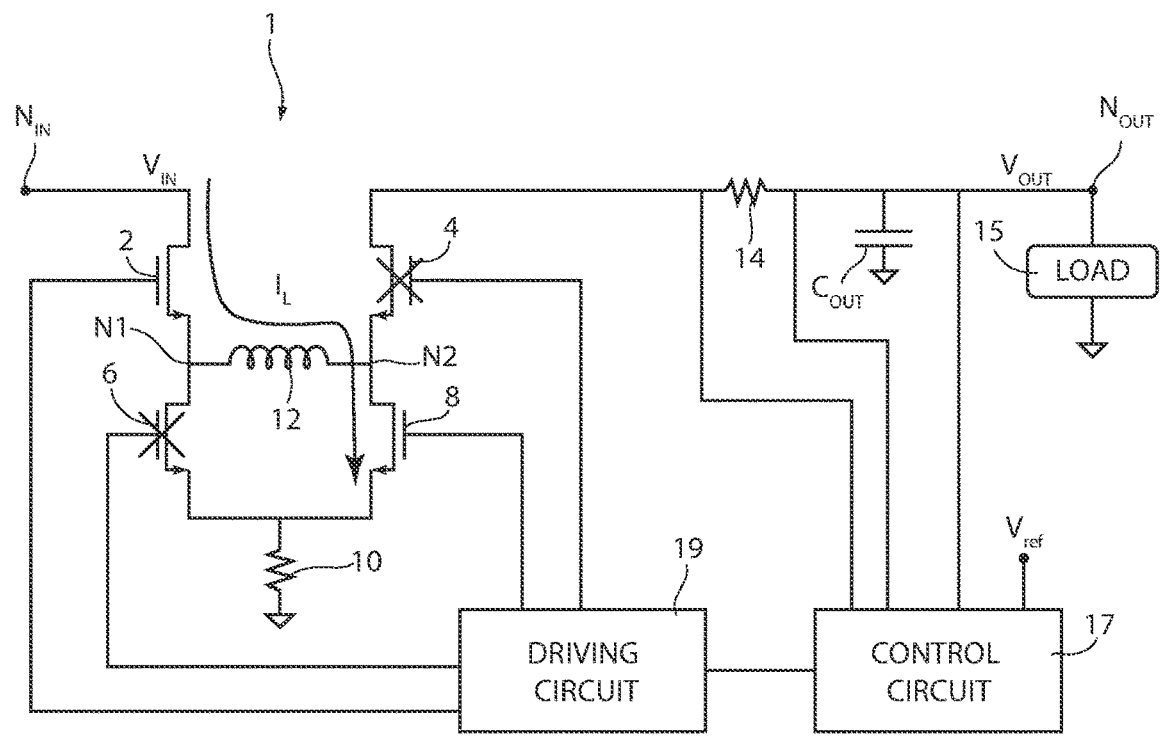
FIGS. 3A and 3B show circuit diagrams of the converter illustrated in FIG. 1 when the converter operates in a second normal operating mode.
Figure 3B:
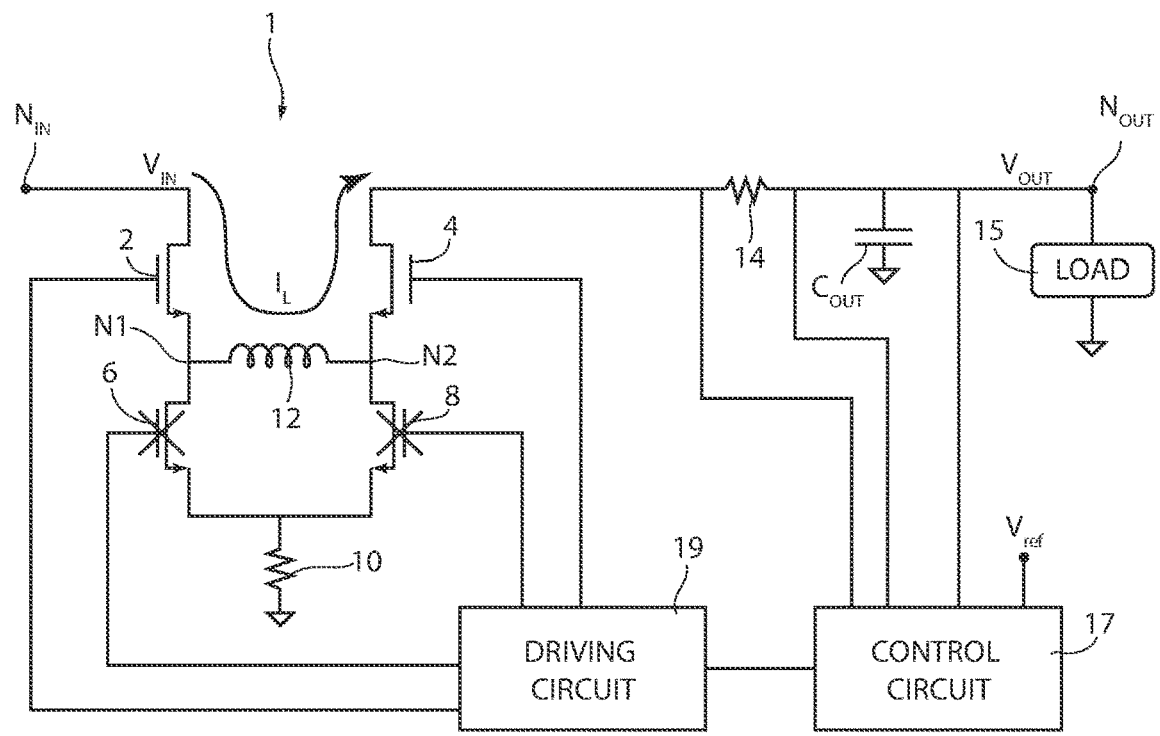

The control module 20 may further control the first and second top transistors 2, 4 and the first and second bottom transistors 6, 8 so that the converter 1 operates in a second operating mode, illustrated schematically in FIGS. 3A and 3B.

In detail, in the second operating mode, the first top transistor 2 is always on, to couple the first internal node N1 to the input node $N_{IN}$. The first bottom transistor 6 is, instead, off so as to decouple the first internal node N1 from the resistor 10, and thus from ground.

The second top transistor 4 and the second bottom transistor 8 are, instead, controlled by the control module 20 in an alternating way. In particular, for each time period T' the second bottom transistor 8 is kept on for a time interval $T'_{ON}$, whereas the second top transistor 4 is off, as illustrated in FIG. 3A; in this way, in the inductor 12 a current $I_L$ flows that grows linearly in time and is directed towards ground through the resistor 10. The inductor 12 thus undergoes a discharging process.

Once the time interval $T'_{ON}$ is over, the second bottom transistor 8 is switched off, whereas the second top transistor 4 is switched on, this configuration remaining for a time interval $T'_{OFF}$, until the end of the time period T' and being represented in FIG. 3B; ideally we have $T'=T'_{ON}+T'_{OFF}$. In this configuration, the current $I_L$, after traversing the shunt resistor 14, then in part charges the output capacitor $C_{OUT}$, which will supply current to the load during the subsequent time interval $T'_{ON}$, and in part goes to the load 15, gradually decreasing, possibly until it vanishes.

In practice, in the second operating mode, the converter 1 behaves like a so-called boost converter. For this reason, in what follows, the second operating mode will be referred to as boost mode. Also, in this case, the inductor 12 undergoes charge and discharge cycles, with transfer of energy onto the load 15.

The converter 1 is thus a buck-boost converter; consequently, if we denote the voltage present on the output node $N_{OUT}$, and thus on the load 15, as $V_{OUT}$, the converter 1 is able to obtain a ratio $V_{OUT}/V_{IN}$ that is alternatively equal to the ratio implemented by buck converters or else to the ratio implemented by boost converters.

Furthermore, the control module 20 may alternate switching periods T during which the converter 1 operates in buck mode with time periods T' during which the converter 1 operates in boost mode to obtain a ratio $V_{OUT}/V_{IN}$ approximately equal to unity.

In greater detail, the control circuit 17 determines the durations of the time intervals $T_{ON}$, $T_{OFF}$, and $T'_{ON}$, $T'_{OFF}$ on the basis of the voltage drop on the resistor 10, and thus on the basis of the current that flows in the resistor 10, which coincides with the current $I_L$ that flows in the inductor 12, and further on the basis of the voltage $V_{OUT}$. For this purpose, the control circuit 17 receives a reference voltage $V_{ref}$ and operates in closed loop in such a way that the voltage $V_{OUT}$ depends upon the reference voltage $V_{ref}$. In addition, albeit not illustrated, the control circuit 17 is connected to the resistor 10.

In greater detail, the control circuit 17 may, for example, implement a control scheme of the converter 1 of a so-called current-mode type, in which the resistor 10 enables detection of the current $I_L$, and thus generation of a first control quantity that is a function of the current $I_L$, which is compared with a second control quantity that is indicative of the difference present between the voltage $V_{OUT}$ and the reference voltage $V_{ref}$, and in which the duty cycle (understood as the ratio between $T_{ON}$, or $T'_{ON}$, and T) is controlled on the basis of the outcome of the comparison in such a way that the inductor 12 functions as a voltage-controlled current generator since the mean value of the current $I_L$ is a function of the difference between the voltage $V_{OUT}$ and the reference voltage $V_{ref}$. Alternatively, the control circuit 17 may implement a control scheme the converter 1 of a so-called voltage-mode type, in which case the duty cycle is controlled only on the basis of the difference between the voltage $V_{OUT}$ and a reference voltage $V_{ref}$, without implementing a further control loop in which the control variable is constituted by the current $I_L$ of the inductor 12. In both cases, by varying the reference voltage $V_{ref}$ a corresponding variation of the voltage $V_{OUT}$ (net of the ripple) is obtained; i.e., it is found that, given a value of the reference voltage $V_{ref}$ the converter 1 acts in such a way that the voltage $V_{OUT}$ assumes a corresponding average value.

In general, if we denote by $V_c$ the voltage drop on the shunt resistor 14, the control circuit 17 may further be configured to detect, on the basis of the voltage $V_c$, the occurrence of an overcurrent in the load 15, for example caused by a malfunctioning of the load 15, which absorbs more current than expected. This overcurrent may be detected using, for example, a current measurement circuit known in the art. For example, the current measurement circuit might include circuitry to measure the voltage across resistor 14 and compare the measured voltage with a predetermined threshold. In some embodiments, the current measurement circuit may be implemented using an analog comparator. Once the overcurrent is detected, the control module 20 may possibly implement mechanisms of protection of the converter 1, such as switching-off of the transistors of the converter 1.

As regards the overcurrent-detection capacity, it should be noted how both in buck mode and in boost mode, the converter 1 regulates a current that is typically in the region of several amperes; the overcurrent thus occurs when the current $I_L$ exceeds a rather high limit value, for example 20 A. Consequently, on the hypothesis that the shunt resistor 14 has a resistance, for example, of 1 mΩ, the voltage $V_c$ on the shunt resistor 14 is normally lower than 20 mV; it is thus possible to detect the occurrence of an overcurrent by implementing, in the control circuit 17, a comparator configured to compare the voltage $V_c$ with a threshold equal, for example, to 20 mV; the current consumption of this comparator is negligible as compared to the voltages and currents present within the converter 1.

However, it is known how, in numerous applications, the converter 1 may be kept in a low-power operating mode known as low-power mode, where it regulates a current much lower than what has been described previously (for example, lower than 1 A) and where not strictly necessary functions of the control circuit 17 are inhibited so as to reduce power consumption. In this case, the voltage $V_c$ present on the shunt resistor 14 may be very low (for example, in the region of 1 mV); consequently, detection of an overcurrent (understood with respect to the current regulated in low-power mode in the absence of malfunctioning, the detection being also known as detection of "soft-short" conditions) via comparison between the voltage $V_c$ and a corresponding threshold is far from precise and/or excessively burdensome in terms of consumption and of occupation of area. In addition, it is not possible to increase the value of the resistance of the shunt resistor 14 since this would lead to an excessive power dissipation.

The present control module, designated by 120, is described with reference to the converter 1 and to the differences with respect to the control module 20 described previously. The control circuit of the control module 120 is designated by 117.

In detail, when the converter 1 operates in low-power mode, the control module 120 keeps the second top transistor 4 off. Furthermore, also in the low-power mode, the converter 1 may operate in buck or boost mode, which will be referred to in what follows as the low-power buck mode and the low-power boost mode. In what follows, the notation $T_{switching}$ is used to denote the duration of the time periods during which the converter 1 operates in low-power buck mode even though it is anticipated that the same considerations apply also to the case where the converter 1 operates in low-power boost mode.

Figure 4A:
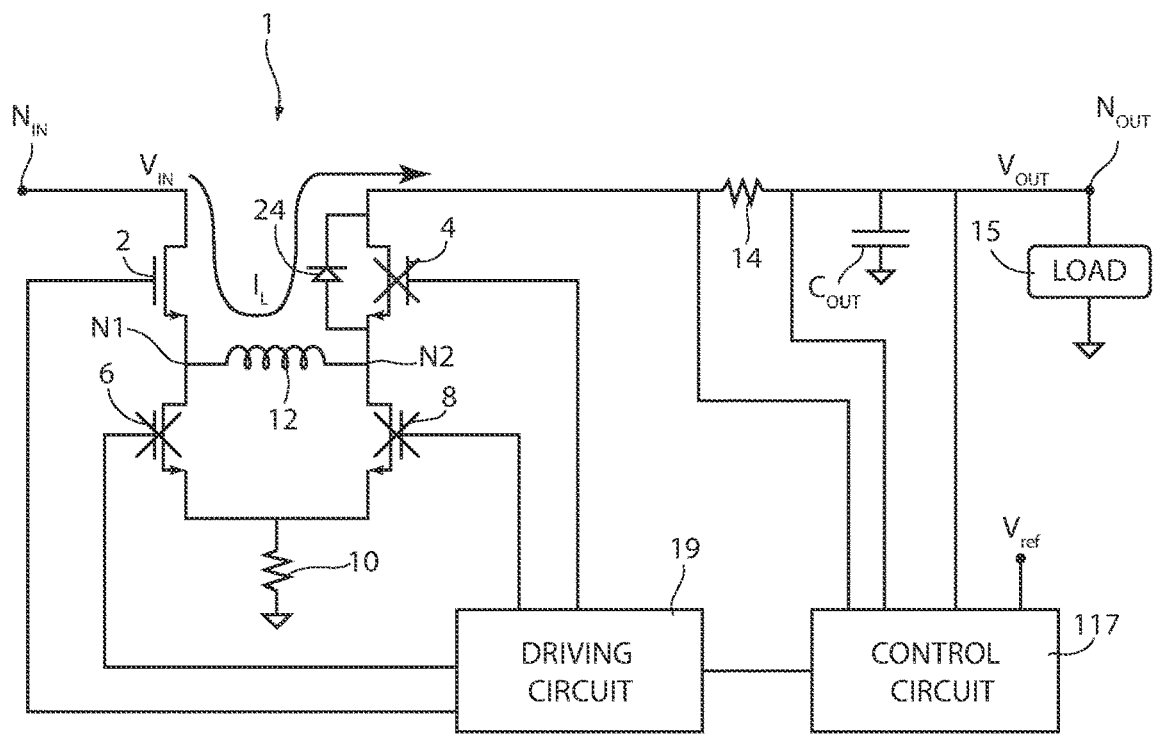
FIGS. 4A and 4B show circuit diagrams of the converter illustrated in FIG. 1 when the converter operates in a first low-power operating mode.

In greater detail, in the case where the converter 1 operates in low-power buck mode, the control module 120 keeps also the second bottom transistor 8 off (both during the time interval $T_{ON}$ and during the time interval $T_{OFF}$), while the first top transistor 2 and the first bottom transistor 6 are controlled in the same way described with reference to the aforementioned buck mode. Consequently, as illustrated in FIG. 4A, during the time interval $T_{ON}$ the current $I_L$, after traversing the first top transistor 2 and the inductor 12, flows through the body diode (designated by 24 and not illustrated in the previous figures) of the second top transistor 4, which has its anode and cathode connected to the source terminal and to the drain terminal, respectively, of the second top transistor 4.

In particular, in low-power mode and irrespective of whether the converter 1 operates in low-power buck mode or low-power boost mode, the load 15 absorbs a reduced current (for example, less than 1 A). Consequently, also the current $I_L$ assumes values that tend to be lower than what occurs during normal operation, understood as the operation described with reference to FIGS. 2A, 2B, 3A, 3B, where the load 15 absorbs a current greater than the aforementioned reduced current. Consequently, the current $I_L$ may traverse the body diode 24 without damaging the second top transistor 4 and with reduced power dissipation. Furthermore, since the second top transistor 4 is off, a reduction of consumption is obtained; in fact, it is possible to disable the part (not illustrated) of driving circuit 19 that drives the second top transistor 4.

Figure 4B:
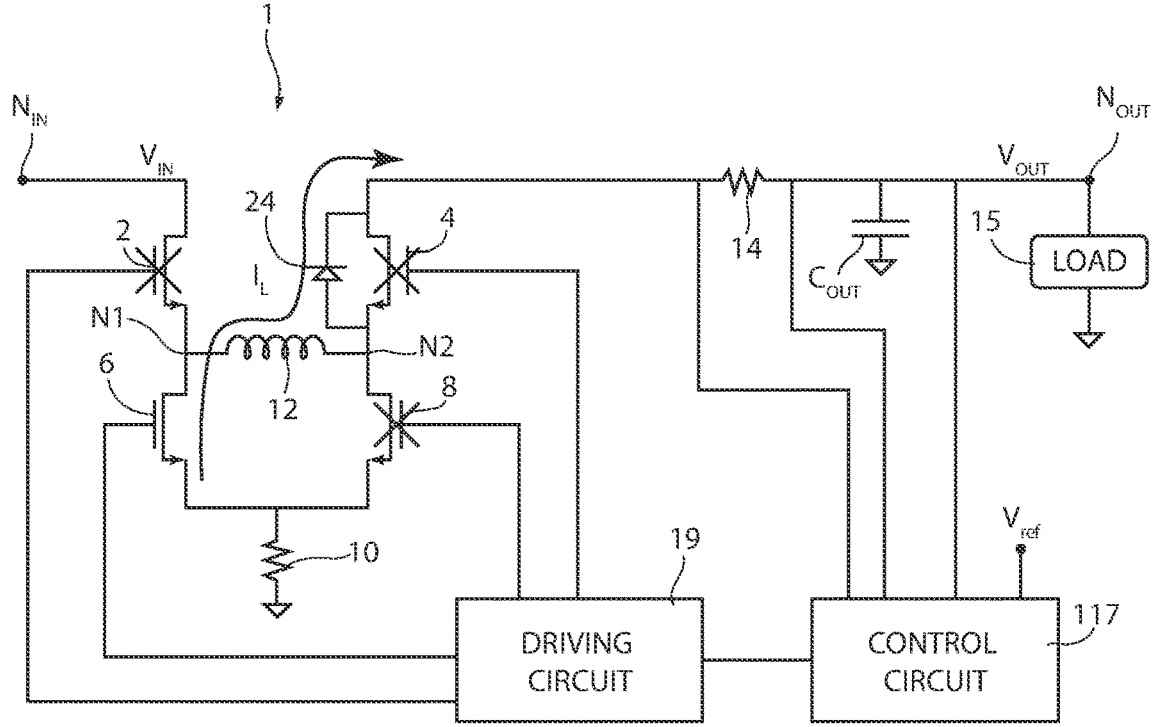

Furthermore, as illustrated in FIG. 4B, during the time interval $T_{OFF}$, the first top transistor 2 and the first bottom transistor 6 are respectively off and on, as already described previously with reference to FIG. 2B. Also, during the time interval $T_{OFF}$, the current IL flows through the body diode 24.

Figure 5:
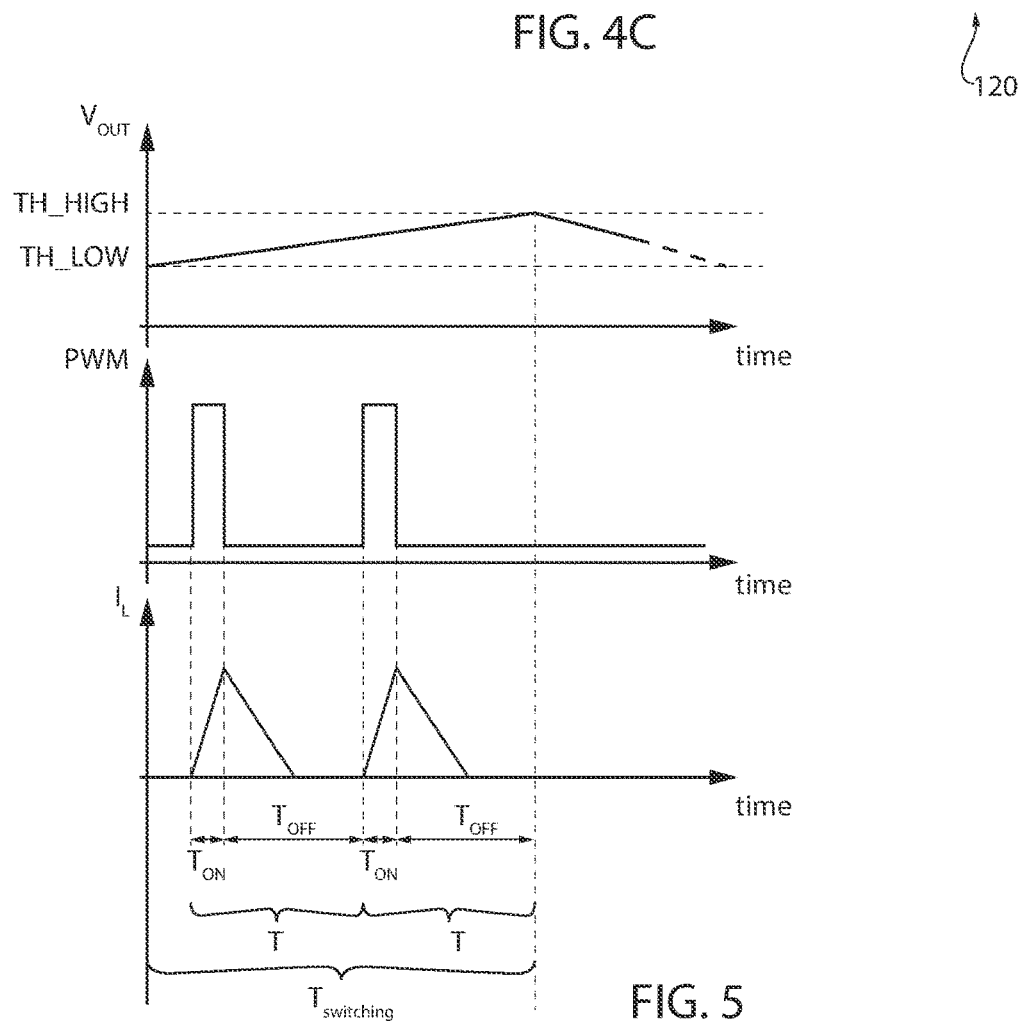
FIGS. 5, 6, 11 and 13 show time plots of electrical quantities.

In practice, what happens is what is qualitatively shown in FIG. 5, which refers, for example, to the case where the converter 1 implements a so-called "discontinuous conduction mode (DCM)", i.e., to the case where the current $I_L$ vanishes during each time period T. In addition, FIG. 5 illustrates a signal PWM generated by the control circuit 117 in such a way that, when the signal PWM is equal to '1', the first top transistor 2 and the first bottom transistor 4 are respectively on and inhibited, and when the signal PWM is equal to '0', the first top transistor 2 and the first bottom transistor 4 are respectively inhibited and on.

In other words, given a time period during which the converter 1 operates in low-power buck mode, this includes a succession of periods of T (two of which are shown in FIG. 5), in each of which the signal PWM is equal to '1' and '0' during the time interval $T_{ON}$ and the time interval $T_{OFF}$, respectively.

This having been said, it may be noted how the value of the current $I_L$ increases during the time interval $T_{ON}$ and then decreases during the subsequent time interval $T_{OFF}$, vanishing before the time period T ends. In addition, net of the ripple (not illustrated), the voltage $V_{OUT}$ increases both during the time interval $T_{ON}$ and during the time interval $T_{OFF}$ since the body diode 24 prevents the output capacitor $C_{OUT}$ from discharging through the second top transistor 4, and thus through the second internal node N2. In other words, the voltage $V_{OUT}$ tends to increase both during the time interval $T_{ON}$ and during the time interval $T_{OFF}$.

The control circuit 117 is further configured to detect when the voltage $V_{OUT}$ reaches a first voltage threshold TH_HIGH and for controlling the converter 1 so that, after the voltage VOUT has reached the first voltage threshold TH_HIGH, it will operate in a pulse-skipping mode.

Figure 4C:
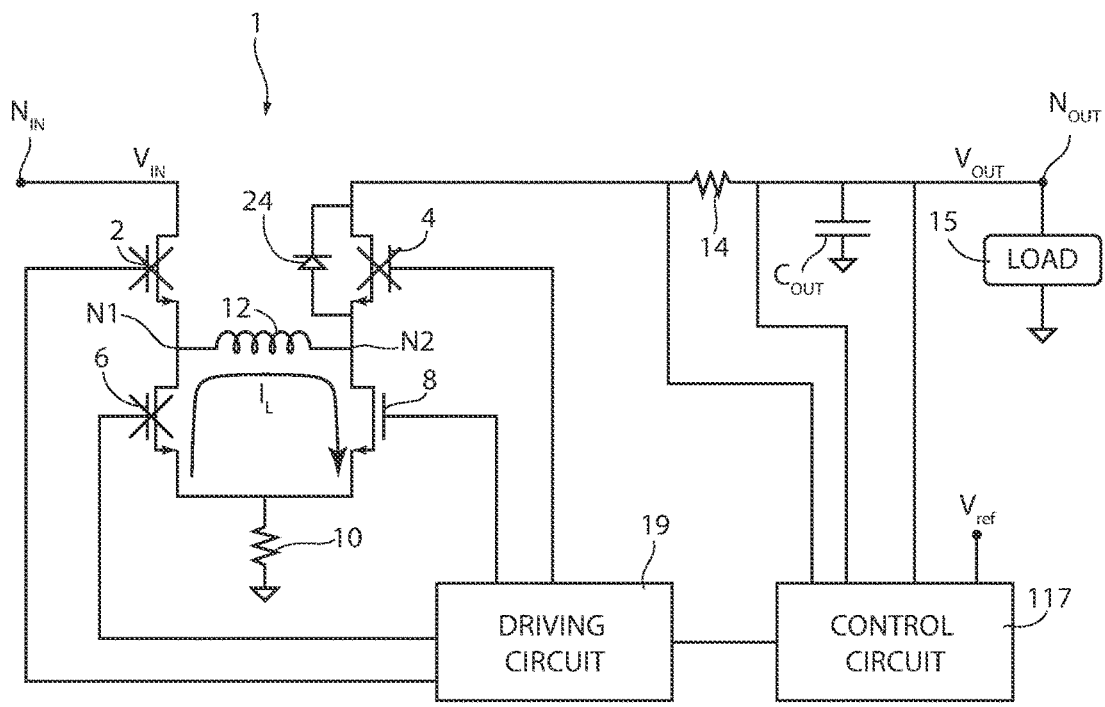
FIG. 4C shows a circuit diagram of the converter illustrated in FIG. 1 when the converter operates in a further low-power operating mode.

In detail, when the control circuit 117 controls the converter 1 so that it will operate in pulse-skipping mode, it continues to keep the second top transistor 4 inhibited and further switches on the second bottom transistor 8, as illustrated in FIG. 4C; the first top transistor 2 and the first bottom transistor 6 are respectively off and on. In this way, the current $I_L$ recirculates in the net formed by the inductor 12 and by the first and second bottom transistors 6, 8. The output capacitor $C_{OUT}$ may thus discharge gradually, with consequent reduction in the voltage $V_{OUT}$, as illustrated in greater detail in FIG. 6.

Figure 6:
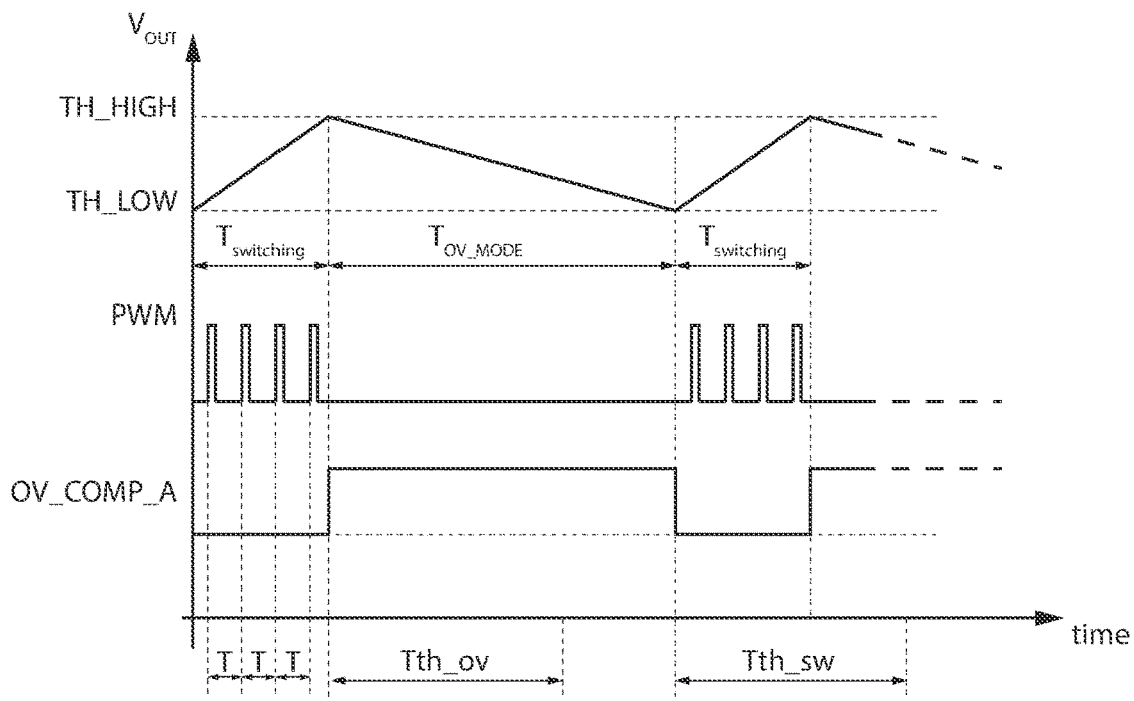

In particular, FIG. 6 shows how the converter 1 will operate in pulse-skipping mode for a time period having a duration TOV_MODE, which terminates when the voltage $V_{OUT}$ reaches a second voltage threshold TH_LOW, which is lower than the first voltage threshold TH_HIGH. In particular, and without this implying any loss of generality, it is assumed that the first voltage threshold TH_HIGH is lower than a value $V^*_{OUT}$, which represents the target value for the voltage $V_{OUT}$; in other words, it is assumed that, when the converter 1 operates in low-power buck mode, the reference voltage $V_{ref}$ is equal to a value $V^*_{ref}$, which represents the value of the reference voltage $V_{ref}$ such that, if the converter 1 were to operate in normal operating mode, we would have (net of the ripple) $V_{OUT}=V^*_{OUT}$ with $V^*_{OUT}>$TH_HIGH.

By way of example, likewise illustrated in FIG. 6 are two time periods during which the converter 1 operates in low-power buck mode, which respectively precede and follow the time period during which the converter 1 operates in pulse-skipping mode.

The duration TOV_MODE of the time period during which the converter 1 operates in pulse-skipping mode is equal to $(TH\_HIGH-TH\_LOW) \cdot C_{OUT}/I_{LOAD}$, where $I_{LOAD}$ represents the current absorbed by the load 15 when the converter 1 operates in the low-power buck mode.

Once again, with reference to FIG. 6, and without this implying any loss of generality, the start of the time period during which the converter 1 operates in pulse-skipping mode is asynchronous with respect to the time periods T. Once again without this implying any loss of generality, the time periods T may instead be synchronous with respect to the end of the previous time period during which the converter 1 has operated in pulse-skipping mode.

All this having been said, the control circuit 117 implements an overcurrent-detection mechanism in low-power mode that is based upon monitoring of the duration $T_{OV\_MODE}$, since, as explained previously, the latter depends upon the current $I_{LOAD}$.

Figure 7:
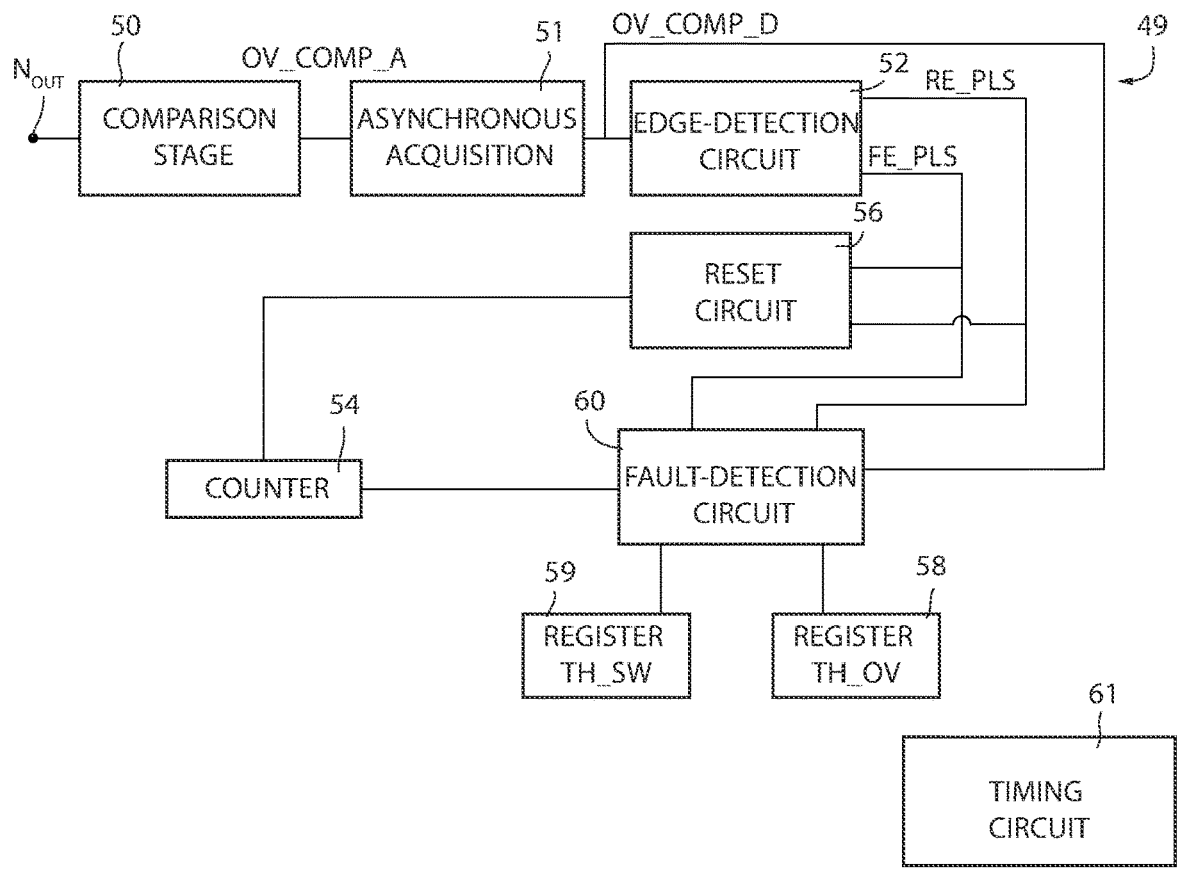
FIG. 7 shows a block diagram of a circuit implemented by the present control module.

In greater detail, the control circuit 117 may, for example, implement a monitoring circuit 49, which is illustrated in FIG. 7 and may be activated when the control module 120 controls the converter 1 in low-power mode.

In particular, the monitoring circuit 49 implements a timing circuit 61, which generates a clock signal with period $T_{clock}$. Further, the monitoring circuit 49 implements a comparison stage 50 and a synchronous acquisition stage 51.

The comparison stage 50 has an input connected to the output node $N_{OUT}$ and generates a signal OV_COMP_A of an analog type, which switches from '0' to '1' (i.e., has a rising edge) when the voltage $V_{OUT}$ reaches, in the rising phase, the first voltage threshold TH_HIGH, and switches from '1' to '0' (i.e., has a falling edge), when the voltage $V_{OUT}$ reaches, in the falling phase, the second voltage threshold TH_LOW, as visible in FIG. 6. Consequently, the signal OV_COMP_A is equal to '1' in the time periods during which the converter 1 operates in pulse-skipping mode and is equal to '0' in the time periods during which the converter 1 operates in low-power buck mode.

The synchronous acquisition stage 51 is connected to the comparison stage 50 to receive the signal OV_COMP_A and generate a digital signal OV_COMP_D, which is synchronous with the clock signal and represents a version of the signal OV_COMP_A having edges synchronous with the clock signal. Consequently, corresponding to each rising/falling edge of the signal OV_COMP_A is a rising/falling edge of the signal OV_COMP_D. Between the signal OV_COMP_D and the signal OV_COMP_A a lag is present introduced by the synchronous acquisition stage 51, which, albeit not illustrated, may comprise, in a per se known manner, two flip-flops (not illustrated) cascaded, timed on the basis of the clock signal, in addition to a possible subsequent digital filter (not illustrated) for filtering possible glitches that may be present on the signal OV_COMP_A.

In practice, net of the tolerances introduced by the temporal discretization of the synchronous acquisition, each time interval during which the signal OV_COMP_D is equal to '1'(or '0') has the same duration as the corresponding time interval during which the signal OV_COMP_A was equal to '1' (or '0'), the latter coinciding with a time interval during which the converter 1 has operated in pulse-skipping mode (or in low-power buck mode). In other words, the duration of each time interval during which the signal OV_COMP_D is equal to '1' is equal to the duration $T_{OV\_MODE}$ of the corresponding time interval during which the signal OV_COMP_A is equal to '1'. Furthermore, the duration of each time interval during which the signal OV_COMP_D is equal to '0' is equal to the duration $T_{switching}$ of the corresponding time interval during which the signal OV_COMP_A is equal to '0'. The signal OV_COMP_D is thus indicative of the durations of the time intervals during which the converter 1 operates in pulse-skipping mode and in low-power buck mode.

The monitoring circuit 49 further implements an edge-detection circuit 52, which is coupled to the synchronous acquisition stage 51 so as to receive the signal OV_COMP_D and is configured to generate a first pulsed signal FE_PLS and a second pulsed signal RE_PLS, which are synchronous with the clock signal and include pulses of duration equal to the period Tclock.

Figure 8:
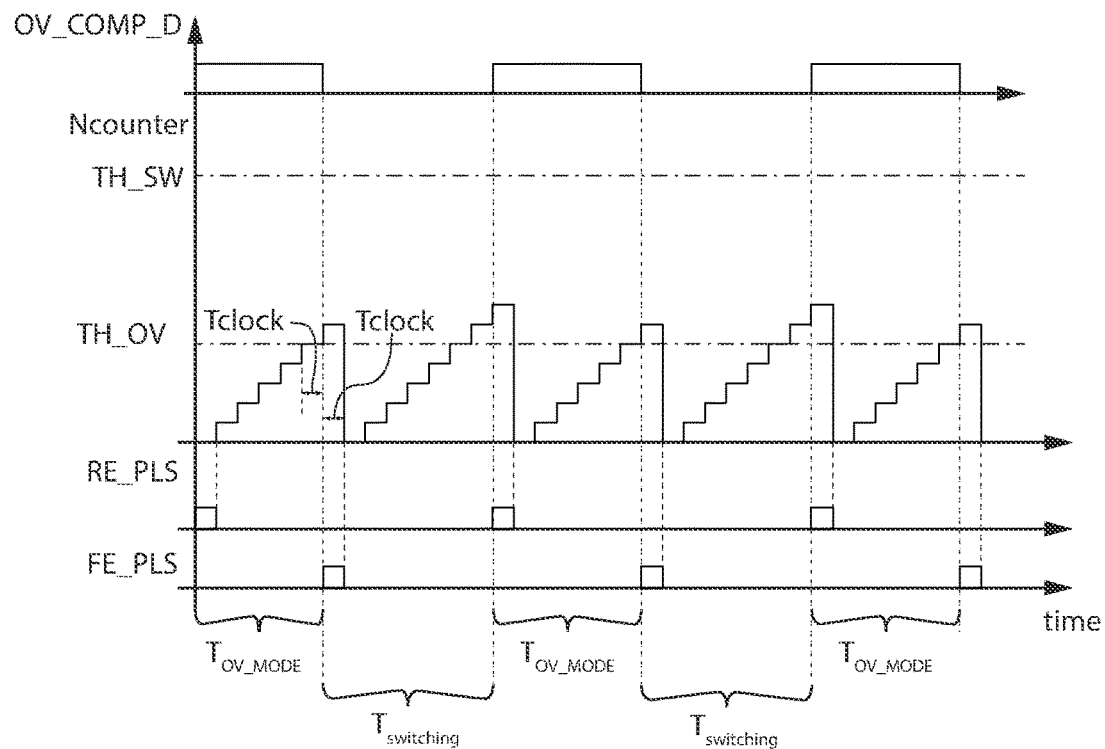
FIGS. 8, 10 and 12 show time plots of signals generated in the present control module.

As illustrated in FIG. 8, the first pulsed signal FE_PLS presents a pulse whenever a falling edge of the signal OV_COMP_D occurs, whereas the second pulsed signal RE_PLS presents a pulse whenever a rising edge of the signal OV_COMP_D occurs.

The monitoring circuit 49 further implements a counter 54, a reset circuit 56, a first register 58, a second register 59, and a fault-detection circuit 60.

The counter 54 stores the value of a variable Ncounter, which is an integer and is incremented at each pulse of the clock signal. In this connection, even though for simplicity of representation the connections coming to the timing circuit 61 are not illustrated in FIG. 7, the timing circuit 61 is connected not only to the counter 54, but also to the synchronous acquisition circuit 51, to the edge-detection circuit 52, to the reset circuit 56 and to the fault-detection circuit 60. The clock signal thus provides the timing to the counter 54, the synchronous acquisition circuit 51, the edge-detection circuit 52, the reset circuit 56, and the fault-detection circuit 60.

In addition, the reset circuit 56 receives at input the first and second pulsed signals FE_PLS, RE_PLS and resets the counter 54, i.e., the value of the variable Ncounter, whenever a pulse of the first pulsed signal FE_PLS or of the second pulsed signal RE_PLS occurs.

The control circuit 117 may be programmed so as to store in the first and second registers 58, 59, respectively, a first threshold TH_OV and a second threshold TH_SW, which are formed by positive integers, with TH_SW>TH_OV. Furthermore, the counter 54 has dimensions such that the maximum value of the variable Ncounter, which in what follows will be referred to as NMAX, is higher than the second threshold TH_SW.

The fault-detection circuit 60 is coupled to the counter 54 and to the first and second registers 58, 59 to receive at input the variable Ncounter and the first and second thresholds TH_OV, TH_SW. In addition, the fault-detection circuit 60 is coupled to the edge-detection circuit 52 to receive the first and second pulsed signals FE_PLS, RE_PLS, and to the synchronous acquisition circuit 51 so as to receive the signal OV_COMP_D.

Figure 9:
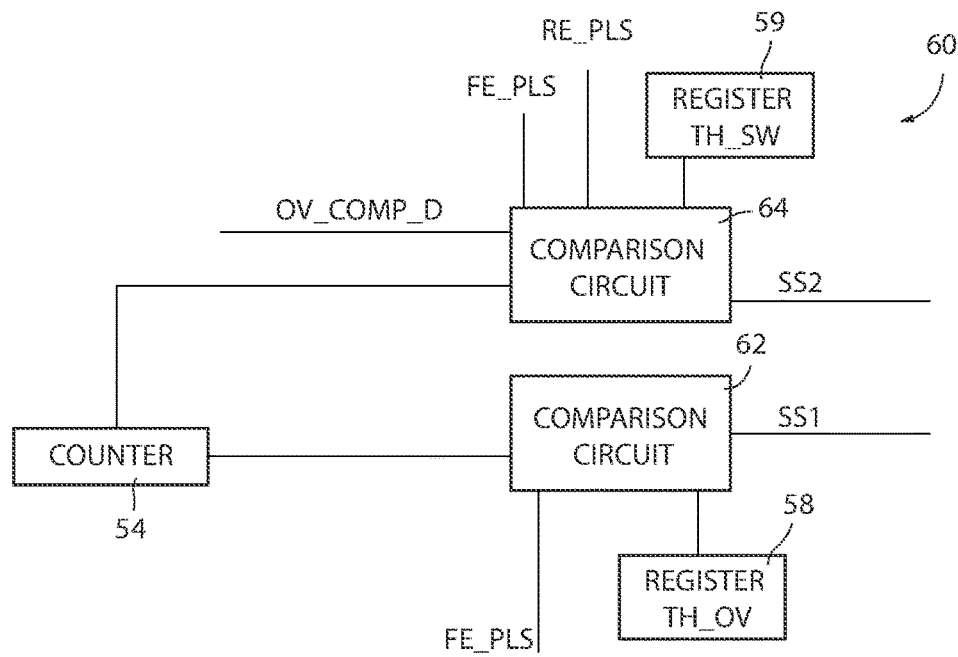
FIG. 9 shows a block diagram of a portion of the circuit illustrated in FIG. 7.

As illustrated in FIG. 9, the fault-detection circuit 60 implements a first comparison circuit 62 and a second comparison circuit 64, which, albeit not illustrated, are connected to the timing circuit 61 so as to receive the clock signal. In various embodiments, comparison circuits 62 and 64 may be implemented using digital comparison circuits or digital comparators known in the art.

The first comparison circuit 62 further has inputs connected respectively to the first register 58 and to the counter 54 to receive the first threshold TH_OV and the variable Ncounter. Furthermore, albeit not illustrated in detail, the first comparison circuit 62 is connected to the edge-detection circuit 52 so as to receive the first pulsed signal FE_PLS.

In practice, the first comparison circuit 62 is configured to detect, for each time period during which the converter 1 operates in pulse-skipping mode, whether the corresponding duration $T_{OV\_MODE}$ is at least equal to a first limit duration Tth_ov. For this purpose, the first comparison circuit 62 executes, at each pulse of the first pulsed signal FE_PLS, and thus whenever a falling edge of the signal OV_COMP_D occurs, a comparison between the first threshold TH_OV and the variable Ncounter, which has been incremented by one for each pulse of the clock signal starting from the previous pulse of the second pulsed signal RE_PLS, as visible in FIG. 8. The value of the variable Ncounter is consequently such that the product Ncounter Tclock is equal to the duration of the time period during which the signal OV_COMP_D was equal to '1' that preceded the pulse of the first pulsed signal FE_PLS, the duration being in turn equal, as explained previously, to the duration $T_{OV\_MODE}$ of the corresponding time period during which the converter 1 has operated in pulse-skipping mode.

If the value of the variable Ncounter is at least equal to the first threshold TH_OV, it means that the duration $T_{OV\_MODE}$ of the time period during which the converter 1 has operated in pulse-skipping mode is at least equal to the first limit duration Tth_ov, which is equal to TH_OV Tclock. Since, as explained previously, the duration $T_{OV\_MODE}$ is equal to (TH_HIGH−TH_LOW) $C_{OUT}/I_{LOAD}$, it is possible to program the first threshold TH_OV as a function of a current $I^*_{LOAD}$ that represents the maximum current that may be absorbed by the load 15 in low-power mode, and in particular such that TH_OV Tclock=(TH_HIGH−TH_LOW) $C_{OUT}/I^*_{LOAD}$.

Figure 10:
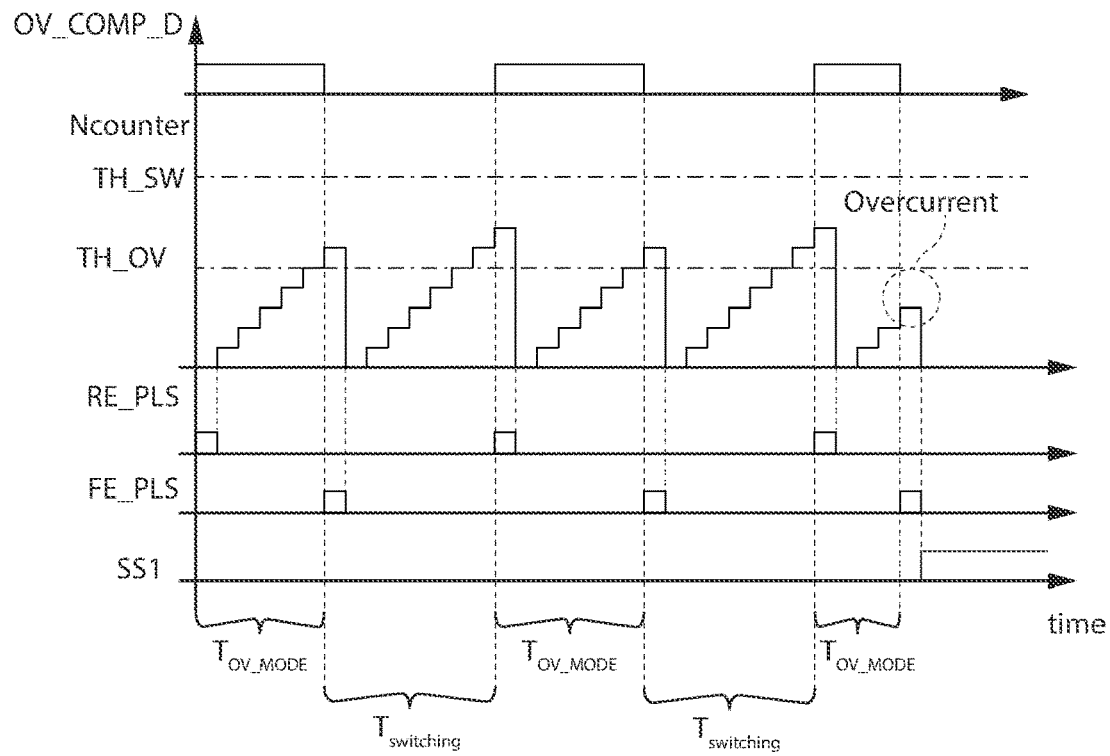
Figure 11:
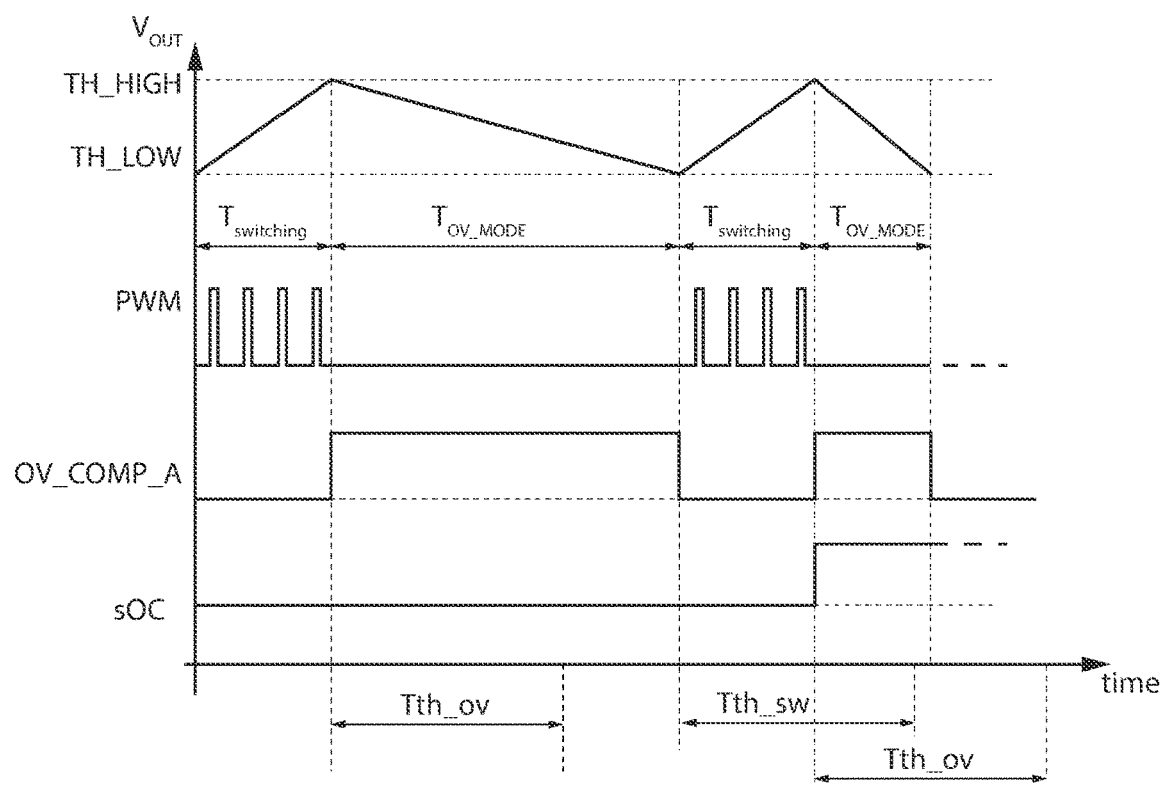

In this way, if the variable Ncounter is at least equal to the first threshold TH_OV, it means that the current $I_{LOAD}$ actually absorbed by the load 15 has not exceeded the current $I^*_{LOAD}$, as illustrated for example in FIG. 6, which shows entirely only a time period during which the converter 1 has operated in pulse-skipping mode, as well as in FIG. 8, which shows three time periods during which the converter 1 has operated in pulse-skipping mode. Otherwise, it means that the current $I_{LOAD}$ has exceeded the current $I^*_{LOAD}$; thus, an overcurrent has occurred, as illustrated for example in FIGS. 10 and 11. In particular, FIG. 10 shows three time periods during which the converter 1 has operated in pulse-skipping mode, with onset of an overcurrent in the third of the time periods. Likewise, FIG. 11 shows two time periods during which the converter 1 has operated in pulse-skipping mode, with onset of an overcurrent (qualitatively indicated by a rising edge of a logic signal sOC) at start of the second time period during which the converter 1 has operated in pulse-skipping mode.

As may be seen once again in FIG. 10, the first comparison circuit 62 may further generate at output a first comparison signal SS1, which is initially equal to '0' and is set equal to '1' following upon execution of a comparison operation that has yielded Ncounter<TH_OV, i.e., following upon detection of an overcurrent.

Without this implying any loss generality, the first comparison circuit 62 may reset the counter 54 following upon execution of a comparison operation that has yielded Ncounter<TH_OV.

In addition, variants may be implemented for example in order to prevent, after reset of the counter 54 caused by reception of a pulse of the second pulsed signal RE_PLS, that possible reaching, before reception of the next pulse of the first pulsed signal FE_PLS, of the maximum value NMAX of the variable Ncounter and consequent new reset (scenario that may occur in the case where the duration $T_{OV\_MODE}$ is excessively long with respect to the dimensions of the counter 54) will prevent a correct check to be carried out. In fact, if upon reception of the pulse of the first pulsed signal FE_PLS it was found that Ncounter<TH_OV, on account of the aforementioned new reset, the first comparison circuit 62 would erroneously detect an overcurrent. In order to prevent the erroneous detection, the first comparison circuit 62 may co-operate with the counter 54 to implement a mechanism of inhibition of increment of the counter 54, after the variable Ncounter has assumed, following upon a reset caused by reception of a pulse of the second pulsed signal RE_PLS, the maximum value NMAX, the inhibition lasting until reception of the pulse of the first pulsed signal FE_PLS subsequent to the pulse of the second pulsed signal RE_PLS so that, upon reception of the pulse of the first pulsed signal FE_PLS, the relation Ncounter>TH_OV applies; consequently, no overcurrent will be detected.

As concerns the second comparison circuit 64, it has inputs connected to the second register 59 and to the counter 54, respectively, so as to receive the second threshold TH_SW and the variable Ncounter; further, albeit not illustrated in detail, the first comparison circuit 62 is connected to the synchronous acquisition circuit 51 and to the edge-detection circuit 52 so as to receive the signal OV_COMP_D and the first and second pulsed signals FE_PLS, RE_PLS.

This having been said, the second comparison circuit 64 is configured to detect, for each period during which the converter 1 operates in the low-power buck mode, whether the corresponding duration $T_{switching}$ is lower than a second limit duration Tth_sw. In fact, in the presence of an overcurrent that occurs during a time period in which the converter 1 operates in low-power buck mode, the voltage $V_{OUT}$ tends to rise slowly and may not manage to reach the first voltage threshold TH_HIGH, notwithstanding the fact that, as mentioned previously, the reference voltage $V_{ref}$ is equal to $V^*_{ref}$.

In practice, during each time period in which the signal OV_COMP_D is equal to '0', the second comparison circuit 64 compares the variable Ncounter with the second threshold TH_SW at each pulse of the clock signal subsequent to the pulse of the first pulsed signal FE_PLS caused by the falling edge of the signal OV_COMP_D that has determined start of the aforementioned time period during which the signal OV_COMP_D is equal to '0'. The comparison is not made for the pulse of the clock signal corresponding to the aforementioned pulse of the first pulsed signal FE_PLS to avoid reading the counter 54 before it has been reset, with the risk of making an erroneous detection, in the case where the variable Ncounter had already reached the second threshold TH_SW.

If the time period during which the signal OV_COMP_D is equal to '0' terminates before the variable Ncounter reaches the second threshold TH_SW, it means that, as illustrated in FIGS. 6, 8, 10 and 11, during the corresponding time period in which the converter 1 has operated in low-power buck mode no overcurrent has occurred.

Figure 12:
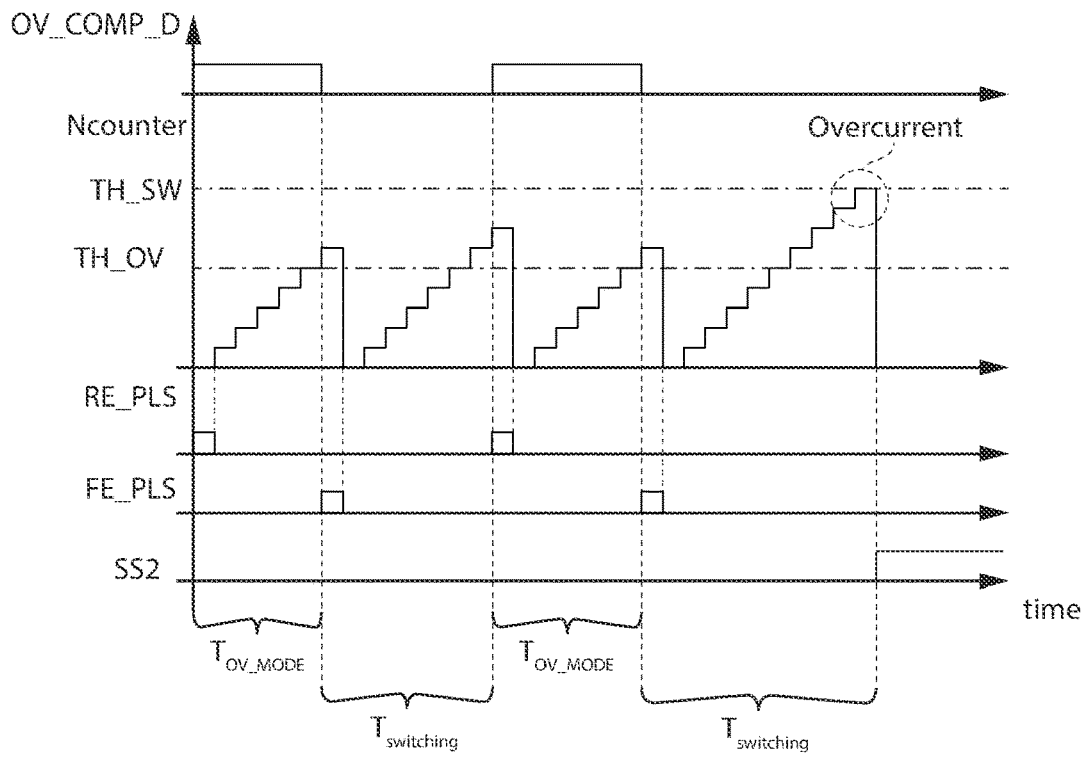
Figure 13:
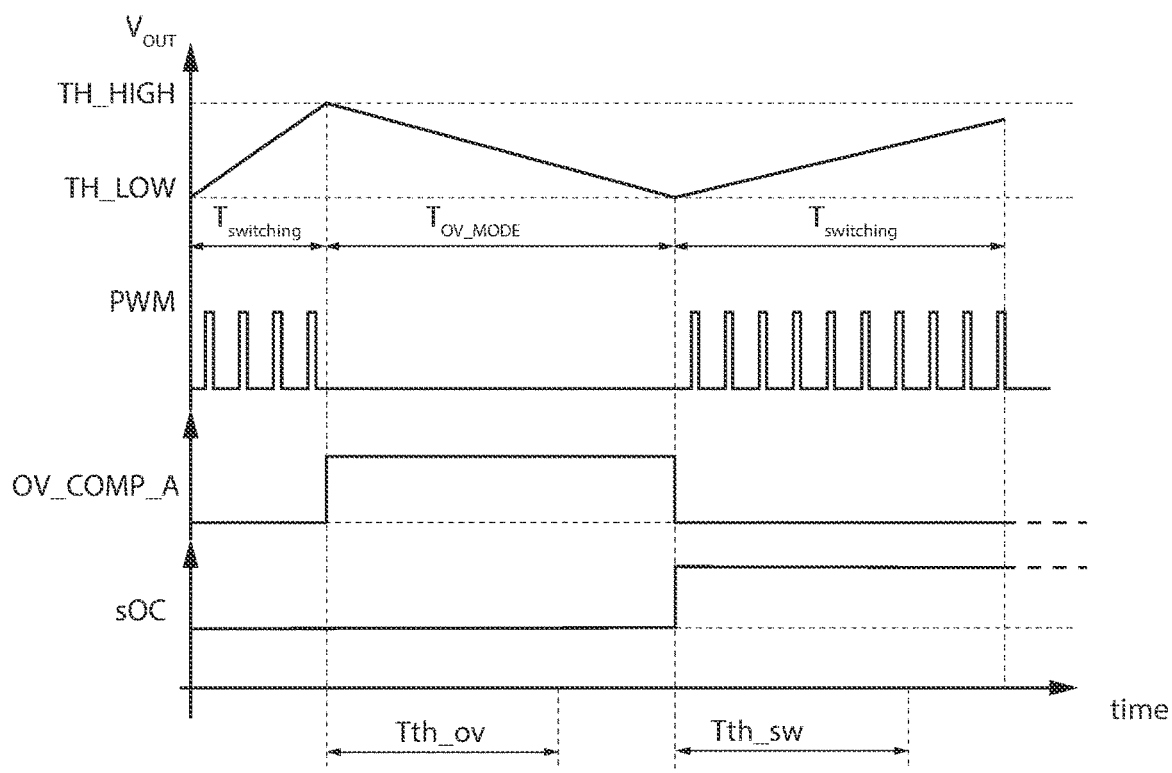

Instead, if, as illustrated in FIGS. 12 and 13, the variable Ncounter reaches the second threshold TH_SW before the end of the time period during which the signal OV_COMP_D is equal to '0', i.e., before the next pulse of the second pulsed signal RE_PLS, it means that an overcurrent has occurred.

In particular, FIG. 12 shows two time periods during which the converter 1 has operated in low-power buck mode, with onset of an overcurrent in the second of the time periods. Likewise, FIG. 13 shows two time periods during which the converter 1 has operated in low-power buck mode, with onset of an overcurrent at the start of the second time period during which the converter 1 has operated in low-power buck mode.

In practice, by varying the value of the second threshold TH_SW, it is possible to vary the limit value that the current $I_{LOAD}$ may assume when the converter 1 operates in low-power buck mode, beyond which an overcurrent is detected.

As may be seen once again in FIG. 12, the second comparison circuit 64 may further generate at output a second comparison signal SS2, which is initially equal to '0' and is set equal to '1' following upon execution of a comparison operation that has yielded Ncounter=TH_SW, i.e., following upon detection of an overcurrent during a time period in which the converter 1 has operated in low-power buck mode.

Without this implying any loss generality, the second comparison circuit 64 may reset the counter 54 following upon execution of a comparison operation that has yielded Ncounter=TH_SW.

The monitoring circuit 49 may further be configured to apply a strategy of protection of the converter 1, on the basis of the comparison signals SS1 and SS2. For instance, the monitoring circuit 49 may be configured to switch off all the transistors of the converter 1, when one of the comparison signals SS1, SS2 becomes equal to '1'.

Figure 14A:
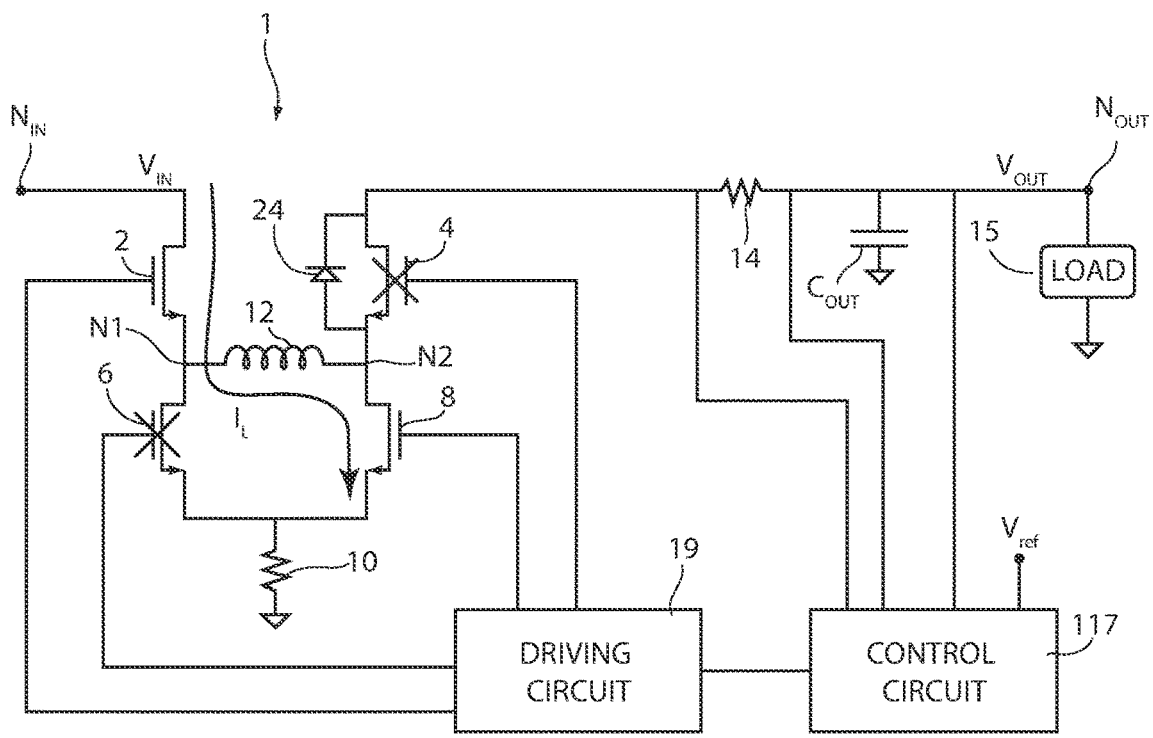
FIGS. 14A and 14B show circuit diagrams of the converter illustrated in FIG. 1 when the converter operates in a second low-power operating mode.
Figure 14B:
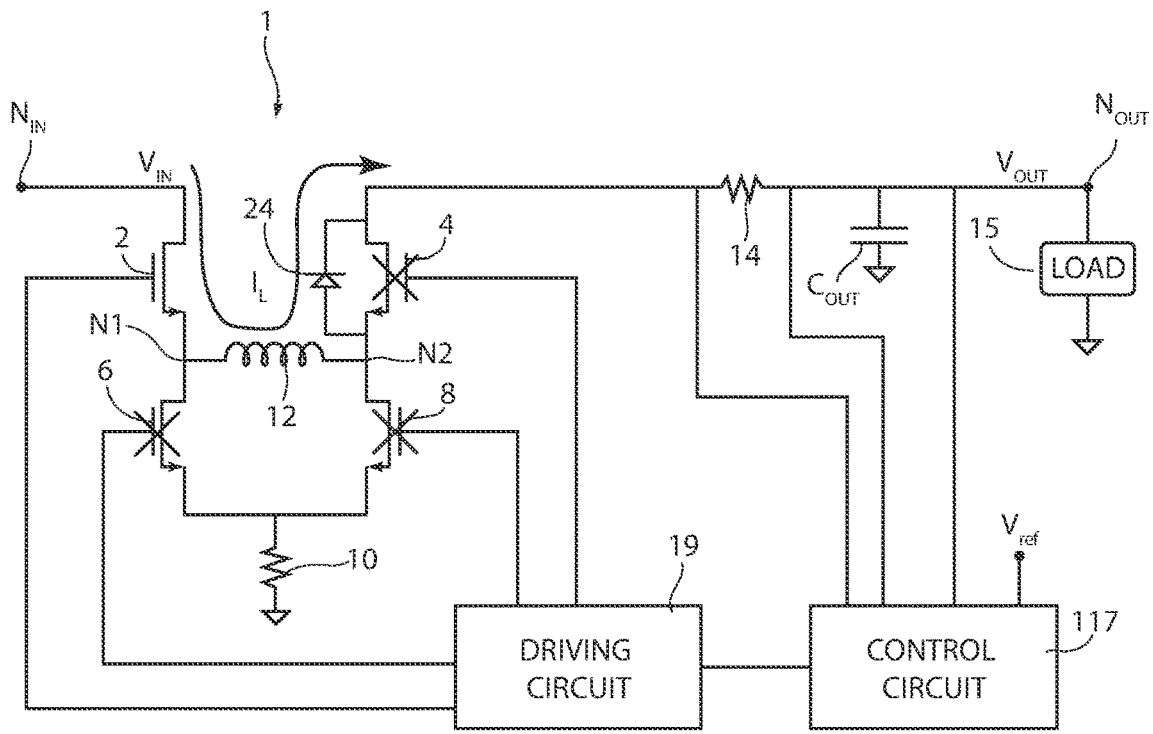

What has been described previously with reference to the case where the converter 1 operates in low-power buck mode also applies in the case where the converter 1 functions, while operating in low-power mode, in boost mode, i.e., in the case where the converter 1 operates in the aforementioned low-power boost mode. In this case, the control module 120, in addition to keeping the second top transistor 4 off, also keeps off the first bottom transistor 6 (both during the time interval $T'_{ON}$ and during the time interval $T'_{OFF}$), while the first top transistor 2 and the second bottom transistor 8 are driven in the same way as described with reference to the aforementioned boost mode. Consequently, as illustrated in FIG. 14A, during the time interval $T'_{ON}$, both the first top transistor 2 and the second bottom transistor 8, through which the current $I_L$ flows, are kept on; the body diode 24 is not traversed by current because it is in a reverse-biasing condition. During the time interval $T'_{OFF}$, the first top transistor 2 remains on, while the second bottom transistor 8 is off, as illustrated in FIG. 14B, so that the current $I_L$ will flow through the body diode 24.

In practice, when the converter 1 operates in low-power boost mode, it behaves like an asynchronous boost converter. Further, also in this case, the voltage $V_{OUT}$ increases both during the time interval $T'_{ON}$ and during the time interval $T'_{OFF}$ since the body diode 24 prevents the output capacitor $C_{OUT}$ from discharging through the second top transistor 4. Consequently, also in this case, the control circuit 117 is configured to detect when the voltage $V_{OUT}$ reaches the first threshold value TH_HIGH and for controlling the converter 1 so that, after the voltage Vou has reached the first threshold value TH_HIGH, it will operate in a pulse-skipping mode, in the same way as described with reference to FIG. 4C, so as to cause recirculation of the current $I_L$ in the net formed by the inductor 12 and by the first and second bottom transistors 6, 8, until the voltage $V_{OUT}$ drops to the second threshold value TH_LOW.

The overcurrent detection in the time periods during which the converter 1 operates in pulse-skipping mode or in low-power boost mode is thus carried out in the same way as described previously.

The advantages that the present control module affords emerge clearly from the foregoing description.

In particular, the present control module implements a new way of detecting overcurrents when the converter 1 operates in low-power mode. The time of discharge of the capacitor $C_{OUT}$ is monitored and compared with a threshold in order to detect whether the current absorbed by the load 15 is higher than the expected one. This detection mechanism is accurate and far from expensive in terms of consumption.

Finally, it is clear that modifications and variations may be made to the control module described and illustrated herein, without thereby departing from the scope of the present invention, as defined in the annexed claims.

For instance, the control circuit 117 may implement different clock signals, which may control different portions of the control circuit 117. For example, the counter 54 may be timed on the basis of a signal of a clock other than the synchronous acquisition circuit 51 and/or the edge-detection circuit 52; it is thus for example possible for the duration of the pulses of the first and second pulsed signals FE_PLS, RE_PLS to be shorter than the period of update of the value of the variable Ncounter.

More in general, the control circuit 117 may adopt mechanisms different from what has been described for verifying the relations present between the durations of the time periods during which the converter 1 operates in pulse-skipping mode or in low-power buck/boost mode and the corresponding limit durations. For instance, it is possible for two different counters to be implemented.

It is further possible for the low-power buck/boost mode to envisage implementation of further functions in order to reduce consumption, in addition to envisaging permanent inhibition of the second top transistor 4.

Furthermore, the control module 120 may alternate periods during which it operates in low-power buck mode with periods during which it operates in low-power boost mode.

It is further possible for transistors of a type different from what has been described to be used, in which case, instead of the body diode 24, a parasitic diode is present that depends upon the type of transistor chosen for implementing the second top transistor 4. Possibly, instead of the body diode 24, a diode external to the second top transistor 4 may be adopted, for example in the case where the latter is replaced by a switch of a type different from a MOSFET.

Finally, embodiments presenting lower performance are possible, in which the detection of overcurrent is limited just to the time periods during which the converter 1 operates in pulse-skipping mode.

What is claimed is:

1. A control module for a switching buck-boost converter comprising an input node configured to receive an input voltage, an output node configured to couple to a load, an inductor, a capacitor, a first top switch, a second top switch, a first bottom switch, and a second bottom switch, the first top switch and the first bottom switch being connected in series so as to form a first internal node, the second top switch and the second bottom switch being connected in series so as to form a second internal node, the inductor being coupled to the first and second internal nodes, the first and second top switches being coupled, respectively, to the input node and to the output node, the capacitor being coupled to the output node, the switching buck-boost converter further comprising a diode coupled to conduction terminals of the second top switch and configured to prevent discharging of the capacitor through the second internal node, when the second top switch is open, the control module comprising:

a controller configured to operate, when coupled to the switching buck-boost converter, in a low-power operating mode during which the controller causes the switching buck-boost converter to alternate between first time periods and second time periods, wherein during the first time periods, the controller is configured to cause the second top switch to be open, and is configured to control the first top switch, the first bottom switch, and the second bottom switch to execute cycles of charge and discharge of the inductor, during which the inductor is traversed by a current, wherein the current traverses the diode during each discharge cycle of the inductor and charges the capacitor in a manner that causes a voltage on the output node to increase from a low threshold value to a high threshold value, and during the second time periods, the controller is configured to cause the first top switch and the second top switch to be open, to cause the first bottom switch and the second bottom switch to be closed during which the current in the inductor recirculates through the first and second bottom switches and the capacitor is discharged by a current that flows in the load in a manner that causes the voltage on the output node to decrease from the high threshold value to the low threshold value;

an acquisition circuit configured to generate a digital signal indicative of durations of the second time periods; and an overcurrent-detection circuit configured to receive the digital signal and comprising a first comparison circuit configured to compare the duration of each second time period with a first limit duration and to indicate an occurrence of an overcurrent when the duration of the second time period is shorter than the first limit duration.

2. The control module according to claim 1, wherein:
the digital signal is further indicative of durations of the first time periods; and
the overcurrent-detection circuit further comprises a second comparison circuit configured to compare the duration of each first time period with a second limit duration and to indicate the occurrence of the overcurrent when the duration of the first time period is at least equal to the second limit duration.

3. The control module according to claim 2, wherein the overcurrent-detection circuit further comprises:
a timing circuit configured to generate a clock signal,
an edge-detection circuit configured to generate, based on the digital signal, an end-of-second-period signal indicative of an end of each second time period, and an end-of-first-period signal indicative of an end of each first time period, and
a counter configured to store a value that is updated based on the clock signal and is reset by the edge-detection circuit at the end of each first time period and of each second time period; and
the first comparison circuit is configured to receive the end-of-second-period signal and to compare the value stored in the counter at the end of each second time period with a first numeric threshold, wherein the first limit duration is a function of the first numeric threshold and of the clock signal.

4. The control module according to claim 3, wherein the second comparison circuit is configured to:
receive the end-of-second-period signal and the end-of-first-period signal, and
detect whether, during each first time period, the value stored in the counter reaches a second numeric threshold.

5. The control module according to claim 1, wherein:
during the first time periods, the controller is further configured to:
cause the second bottom switch to be open,
cause the first top switch and the first bottom switch to be respectively closed and open in a first sub-interval of the first time period to charge the inductor,
cause the first top switch and the first bottom switch to be respectively open and closed in a second sub-interval of the first time period to discharge the inductor, wherein the current that flows in the inductor traverses the diode during the first sub-interval and in the second sub-interval; or
during the first time periods, the controller is further configured to:
cause the first bottom switch to be open,
cause the first top switch and the second bottom switch to be respectively closed during the first sub-interval of the first time period to charge the inductor,
cause the first top switch and the second bottom switch to be respectively closed and open in the second sub-interval of the first time period to discharge the inductor, wherein the current that flows in the inductor traverses the diode during the first sub-interval and in the second sub-interval.

6. The control module according to claim 1, wherein:
the controller is further configured to cause the switching buck-boost converter to alternate between operating in the low-power operating mode and in a high-power mode;
during the high-power mode, the controller is configured to cause the switching buck-boost converter to selectively operate in a high-power buck mode or a high-power boost mode;
during the high-power buck mode, the controller is configured to:
keep the second top switch closed and the second bottom switch open, and
control the first top switch and the first bottom switch in an alternating manner; and
during the high-power boost mode, the controller is configured to:
keep the first top switch closed and the first bottom switch open, and
control the second top switch and the second bottom switch in an alternating manner.

7. An electronic system comprising the control module and the switching buck-boost converter according to claim 1.

8. The electronic system according to claim 7, wherein:
the first top switch, the second top switch, the first bottom switch, and the second bottom switch each comprises a MOSFET; and
the diode is a body diode of the second top switch.

9. A method for controlling a switching buck-boost converter comprising an input node configured to receive an input voltage, an output node configured to couple to a load, an inductor, a capacitor, a first top switch, a second top switch, a first bottom switch, and a second bottom switch, the first top switch and the first bottom switch being connected in series so as to form a first internal node, the second top switch and the second bottom switch being connected in series so as to form a second internal node, the inductor being coupled to the first and second internal nodes, the first and second top switches being coupled, respectively, to the input node and to the output node, the capacitor being coupled to the output node, the switching buck-boost converter further comprising a diode coupled to conduction terminals of the second top switch and configured to prevent discharging of the capacitor through the second internal node, when the second top switch is open, the method comprising:
operating the switching buck-boost converter in a low-power operating mode comprising alternating first time periods and second time periods,
during the first time periods, operating the switching buck-boost converter in the low-power operating mode comprises
causing the second top switch to be open, and
controlling the first top switch, the first bottom switch, and the second bottom switch to execute cycles of charge and discharge of the inductor during which the inductor is traversed by a current, wherein the current traverses the diode during each discharge cycle of the inductor and charges the capacitor in a manner that causes a voltage on the output node to increase from a low threshold value to a high threshold value, and during the second time periods, operating the switching buck-boost converter in the low-power operating mode comprises causing the first top switch and the second top switch to be open, and causing the first bottom switch and the second bottom switch to be closed during which the current in the inductor recirculates through the first and second bottom switches and the capacitor is discharged by a current that flows in the load in a manner that causes the voltage on the output node to decrease from the high threshold value to the low threshold value;

generating a digital signal indicative of durations of the second time periods; and based on the digital signal, comparing the duration of each second time period with a first limit duration and indicating an occurrence of an overcurrent when the duration of the second time period is shorter than the first limit duration.

10. The method according to claim 9, wherein:

the digital signal is further indicative of durations of the first time periods; and the method further comprises comparing, based on the digital signal, the duration of each first time period with a second limit duration and indicating the occurrence of the overcurrent when the duration of the first time period is at least equal to the second limit duration.

11. The method according to claim 10, wherein comparing the duration of each second time period with the first limit duration comprises:

generating a clock signal;

generating, based on the digital signal, an end-of-second-period signal indicating an end of each second time period, and an end-of-first-period signal indicating an end of each first time period;

updating a value of a counter based on the clock signal;

resetting the counter at the end of each first time period and of each second time period; and based on the end-of-second-period signal, comparing the value of the counter at the end of each second time period with a first numeric threshold, wherein the first limit duration is a function of the first numeric threshold and of the clock signal.

12. The method according to claim 11, wherein comparing the duration of each first time period with the second limit duration comprises indicating whether the value stored in the counter reaches a second numeric threshold during each first time period based on the end-of-second-period signal and the end-of-first-period signal.

13. The method according to claim 9, wherein operating the switching buck-boost converter in the low-power operating mode further comprises:

during the first time periods:

causing the second bottom switch to be open, causing the first top switch and the first bottom switch to be respectively closed and open in a first sub-interval of the first time period to charge the inductor, causing the first top switch and the first bottom switch to be respectively open and closed in a second sub-interval of the first time period to discharge the inductor, wherein the current that flows in the inductor traverses the diode during the first sub-interval and in the second sub-interval; or during the first time periods:

causing the first bottom switch to be open, causing the first top switch and the second bottom switch to be respectively closed during the first sub-interval of the first time period to charge the inductor, causing the first top switch and the second bottom switch to be respectively closed and open in the second sub-interval of the first time period to discharge the inductor, wherein the current that flows in the inductor traverses the diode during the first sub-interval and in the second sub-interval.

14. The method according to claim 9, further comprising causing the switching buck-boost converter to alternate between operating in the low-power operating mode and operating in a high-power mode, wherein:

operating in the high-power mode comprises causing the switching buck-boost converter to selectively operate in a high-power buck mode or operating in a high-power boost mode;

operating in the high-power buck mode comprises:

keeping the second top switch closed and the second bottom switch open, and controlling the first top switch and the first bottom switch in an alternating manner; and operating in the high-power boost mode comprises keeping the first top switch closed and the first bottom switch open, and controlling the second top switch and the second bottom switch in an alternating manner.

15. A switched-mode power supply comprising:

a power supply controller configured to be coupled to a power supply circuit comprising a plurality of switches coupled between a power input node and a power output node, and an inductor coupled to the plurality of switches, the power supply controller configured to operate the power supply circuit in a low-power mode comprising alternating first time periods and second time periods, wherein the power supply controller is configured to:

apply an active switching signal to at least one of the plurality of switches during the first time periods when an output voltage of the power output node transitions from a first predetermined voltage threshold to a second predetermined voltage threshold, and apply a static switching signal to each of the plurality of switches during the second time periods when the output voltage of the power output node transitions from the second predetermined voltage threshold to the first predetermined voltage threshold;

a voltage measurement circuit configured to be coupled to the power output node; and a first overcurrent measurement circuit coupled to the voltage measurement circuit and configured to indicate a first overcurrent condition when a time duration of a first time period of the first time periods is less than a first threshold, or when a time duration of second period of the second time periods is greater than a second threshold.

16. The switched-mode power supply of claim 15, wherein the first overcurrent measurement circuit comprises:

a digital counter; and at least one digital comparison circuit coupled to the counter, the at least one digital comparison circuit configured to compare a value of the digital counter with the first threshold or the second threshold.

17. The switched-mode power supply of claim 15, wherein:

the power supply controller further comprises a second overcurrent measurement circuit configured to be coupled to a shunt resistor connected between the plurality of switches and the power output node;

the first overcurrent measurement circuit is active when the power supply circuit is operated in the low-power mode; and the second overcurrent measurement circuit is active when the power supply circuit is operated in a normal operating mode.

18. The switched-mode power supply of claim 17, wherein the first overcurrent measurement circuit is configured to detect a smaller output current than the second overcurrent measurement circuit.

19. The switched-mode power supply of claim 17, further comprising the power supply circuit.

20. The switched-mode power supply of claim 19, wherein:

the plurality of switches comprises:

a first switch coupled between the power input node and a first node, a second switch coupled between the first node and a first reference node, a third switch coupled between the power output node and a second node, a fourth switch coupled between the second node and the first reference node, wherein the an inductor is coupled between the first node and the second node.

* * * * *

UNITED STATES PATENT AND TRADEMARK OFFICE
CERTIFICATE OF CORRECTION

| | | |
|---|---|---|
| PATENT NO. | : 12,341,421 B2 | Page 1 of 1 |
| APPLICATION NO. | : 18/171946 | |
| DATED | : June 24, 2025 | |
| INVENTOR(S) | : Moretti et al. | |

It is certified that error appears in the above-identified patent and that said Letters Patent is hereby corrected as shown below:

In the Claims

In Column 19, Line 27 Claim No. 20:
Change "first reference node, wherein the an inductor is coupled"
To --first reference node, wherein the inductor is coupled--

Signed and Sealed this
Ninth Day of September, 2025

Coke Morgan Stewart
*Acting Director of the United States Patent and Trademark Office*